No. 854,784. PATENTED MAY 28, 1907.
J. B. WIARD.
DYNAMO ELECTRIC MACHINE.
APPLICATION FILED AUG. 10, 1906.

2 SHEETS—SHEET 1.

WITNESSES
INVENTOR
JOHN B. WIARD

No. 854,784. PATENTED MAY 28, 1907.
J. B. WIARD.
DYNAMO ELECTRIC MACHINE.
APPLICATION FILED AUG. 10, 1906.

2 SHEETS—SHEET 2.

Witnesses:

Inventor:
John B. Wiard
by
Atty.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DYNAMO-ELECTRIC MACHINE.

No. 854,784. Specification of Letters Patent. Patented May 28, 1907.

Application filed August 10, 1906. Serial No. 329,998.

*To all whom it may concern:*

Be it known that I, JOHN B. WIARD, a citizen of the United States, residing at Lynn, in the county of Essex and State of Massachusetts, have invented certain new and useful Improvements in Dynamo-Electric Machines, of which the following is a specification.

My invention relates to dynamo-electric machines with distributed windings, and its object is to arrange such machines so that the connections of the winding may be changed in a simple and expeditious manner.

It is frequently desirable to arrange a machine, such, for instance, as an induction motor, for operation on two or more different voltages. This has been accomplished heretofore by making the primary winding of the motor with two or more circuits, which may be connected in series or in parallel. This, in case of small motors, makes the connections at the ends of the coils bulky. Furthermore, as the leads from the coils are twisted on to these connections and soldered, it is very difficult to break these joints and reconnect the winding satisfactorily.

My invention consists in forming the connections, which it may be desired to change, by means of a separate cable connected to the winding and comprising conductors arranged to make the desired connections. In the case of a polyphase induction motor which is to be arranged for operation on different voltages, the coils for each phase for each pole may be premanently connected together so as to give two terminals per phase per pole, while the connections between poles and phases are made by means of the cable, since these are the only connections which need to be changed for operating the motor on different voltages. I preferably arrange the cable at the opposite end of the machine from the connections between the coils of the same phase and pole, since in this manner the terminal connections are rendered more accessible, and the application and detachment of the cable are facilitated.

Figure 1:
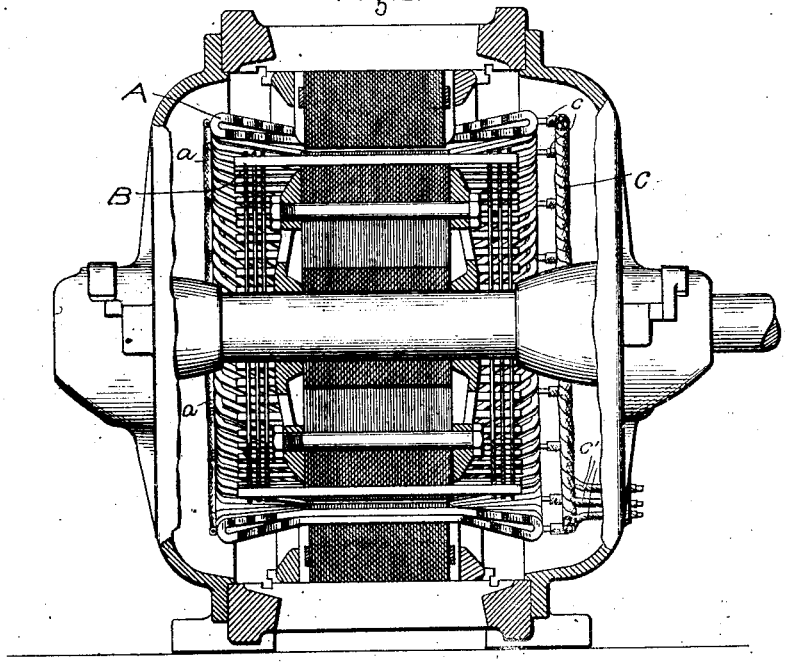
Figure 2:
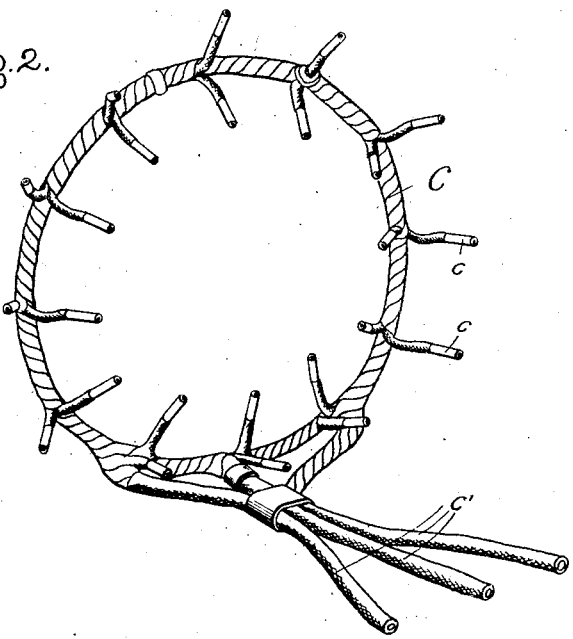
Figure 3:
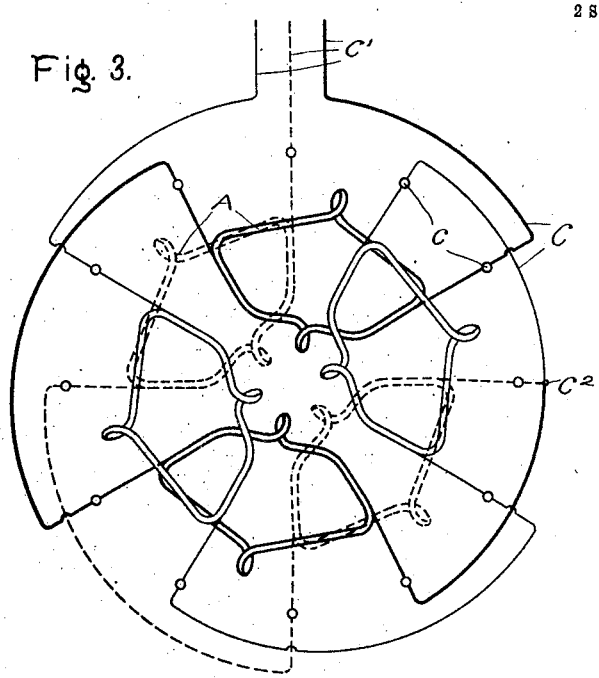
Figure 4:
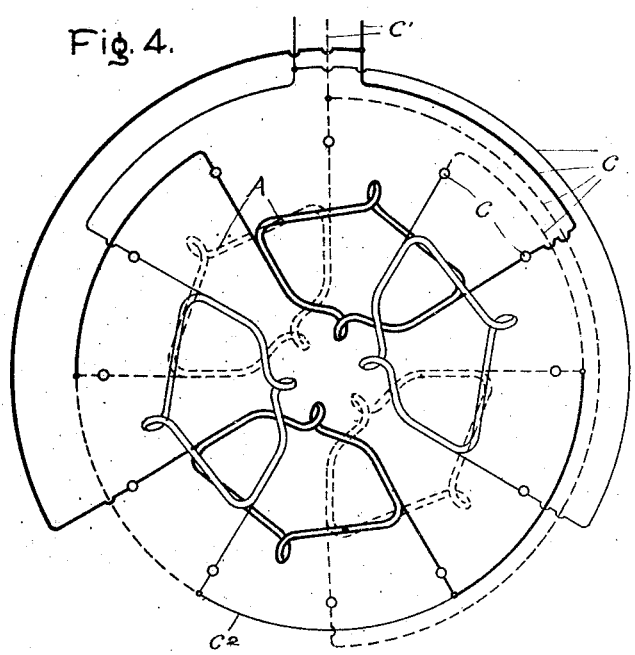

My invention will best be understood by reference to the accompanying drawings, in which Figure 1 shows a side elevation in cross-section of an induction motor arranged in accordance with my invention; Fig. 2 shows a perspective view of the connection-cable; and Figs. 3 and 4 show diagrammatically the connections formed by two different cables applied to the same motor.

In the drawings, A represents the primary winding of the motor, which is shown mounted on a laminated stator structure of the usual construction.

B represents the rotor winding, which is shown as a standard squirrel-cage.

$a$ $a$ represent the usual connections between the coils of the distributed winding A, but in the motor of Fig. 1 only a portion of the usual connections are employed,—i. e., those which connect together the coils of each pole and phase. The connections between poles and phases are made by means of a cable C, which is connected to the opposite end of the primary coils, and which comprises a number of independent conductors bound together with their terminals brought out as shown clearly in Fig. 2. These conductors are so arranged that when the proper terminals are connected to the proper coils of the primary winding, the desired connections between poles and phases are secured. The terminals of the conductors in the cable may be attached to the coils by means of small copper tubes $c$, shown in Fig. 2, which may be pinched at one end, fastening them to the terminals projecting from the cable, and then soldered to both conductors and coils. The cable may readily be detached by heating these tubes with an iron and pulling the coil terminals out. Leads $c^1$ are brought out from the cable C for connection to the source of current.

In Fig. 3 I have shown diagrammatically the terminal connections of a detachable cable for a three-phase motor. The three-phases are shown by a heavy line, a light line, and a dotted line, respectively. Only one coil per pole per phase is shown in the figure, so that the end-connections $a$ shown in Fig. 1 are omitted. It will be seen that the conductors are so arranged in the cable C that the current entering any one of the terminal leads $c^1$ passes through both coils of one phase in series to a common point $c^2$. The winding is thus connected in Y with both coils of each phase in series with each other. Fig. 4 shows how the same motor may be connected for operation on half voltage by substituting another cable with proper connections. The conductors of the cable C in Fig. 4 are so arranged that the current, entering any one of the terminal leads $c^1$, passes in parallel through the two coils of a phase to the common conductor $c^2$. The motor is thus connected in Y with the coils of each phase in parallel. Obviously the conductors in cable C can be arranged to make any other desired changes, as, for instance, changing from Y to delta, or varying the number of poles of the motor in any well known manner.

What I claim as new and desire to secure by Letters Patent of the United States, is,

1. In a dynamo-electric machine, a distributed winding, and a separate cable connected to the coils of said winding comprising conductors arranged to establish predetermined connections between said coils.

2. In a dynamo-electric machine, a distributed winding, and a separate cable connected to the coils of said winding comprising a plurality of independent conductors having their terminals arranged to establish predetermined connections between said coils.

3. In a dynamo-electric machine, a distributed winding, and a separate cable connected to the coils of said winding comprising a plurality of independent conductors bound together with their ends projecting, said conductors being arranged to establish predetermined connections between said coils.

4. In a dynamo-electric machine, a multipolar distributed winding, the coils of each pole being permanently connected together, and a separate cable connected to said winding comprising conductors arranged to establish the desired connections between poles.

5. In a dynamo-electric machine, a multipolar distributed winding, the coils of each pole being permanently connected together, and a separate cable connected to said winding comprising a plurality of independent conductors bound together with their ends projecting, said conductors being arranged to establish the desired connections between poles.

6. In an induction motor, a distributed primary winding, the coils of each phase for each pole being permanently connected together, and a separate cable connected to said winding comprising conductors arranged to establish the desired connections between poles and phases.

7. In an induction motor, a distributed primary winding, the coils of each phase for each pole being permanently connected together, and a separate cable connected to said winding comprising a plurality of independent conductors bound together with their ends projecting, said conductors being arranged to establish the desired connections between poles and phases.

8. In a dynamo-electric machine, a distributed winding having its coils in part permanently connected at one end, and a separate cable connected to said winding at the other end of said coils and comprising conductors arranged to establish the remaining coil connections.

9. In a dynamo-electric machine, a distributed winding having its coils in part permanently connected at one end, and a separate cable connected to said winding at the other end of said coils and comprising a plurality of independent conductors bound together with their terminals projecting, said conductors being arranged to form the remaining coil connections.

10. In a dynamo-electric machine, a distributed winding, and a separate cable connected to the coils of said winding comprising conductors arranged to establish predetermined connections between said coils and between said winding and the external circuit.

11. In a dynamo-electric machine, a distributed winding, and a separate cable connected to the coils of said winding comprising a plurality of independent conductors bound together with their ends projecting, said conductors being arranged to establish predetermined connections between said coils and between said winding and the external circuit.

12. In a dynamo-electric machine, a multipolar distributed winding, the coils of each pole being permanently connected together, and a cable detachably connected to said winding comprising conductors arranged to establish the desired connections between poles and between said winding and the external circuit.

13. In an induction motor, a distributed primary winding, the coils of each phase for each pole being permanently connected together, and a separate cable connected to said winding comprising conductors arranged to establish the desired connections between poles and phases and between said winding and the external circuit.

14. In an induction motor, a distributed primary winding, the coils of each phase for each pole being permanently connected together, and a separate cable connected to said winding comprising a plurality of independent conductors bound together with their ends projecting, said conductors being arranged to establish the desired connections between poles and phases.

15. In a dynamo-electric machine, a distributed winding having its coils in part permanently connected at one end, and a separate cable connected to said winding at the other end of said coils and comprising conductors arranged to establish the remaining coil connections and to connect said winding to the external circuit.

In witness whereof, I have hereunto set my hand this sixth day of August, 1906.

JOHN B. WIARD.

Witnesses:
JOHN A. McMANUS, Jr.,
HENRY O. WESTENDARP.